(12) United States Patent
Takemura

(10) Patent No.: US 11,328,633 B2
(45) Date of Patent: May 10, 2022

(54) INFORMATION PROVIDING DEVICE

(71) Applicant: KABUSHIKI KAISHA TOYOTA JIDOSHOKKI, Kariya (JP)

(72) Inventor: Kenji Takemura, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/110,794

(22) Filed: Dec. 3, 2020

(65) Prior Publication Data

US 2021/0174713 A1 Jun. 10, 2021

(30) Foreign Application Priority Data

Dec. 10, 2019 (JP) .............................. JP2019-223013

(51) Int. Cl.
*G09F 21/04* (2006.01)
*B60Q 1/50* (2006.01)
*G06K 9/00* (2022.01)

(52) U.S. Cl.
CPC .......... *G09F 21/048* (2013.01); *B60Q 1/503* (2013.01); *G06K 9/00791* (2013.01)

(58) Field of Classification Search
CPC .... G09F 21/048; G09F 21/0485; B60Q 1/503
See application file for complete search history.

(56) References Cited

U.S. PATENT DOCUMENTS

| | | | |
|---|---|---|---|
| 6,769,726 B1* | 8/2004 | Clark | B60R 13/00 296/21 |
| 9,607,510 B1* | 3/2017 | DeLorean | G06Q 30/0241 |
| 10,269,273 B1* | 4/2019 | Borden | E04B 1/34336 |
| 2008/0030427 A1* | 2/2008 | Lanham | G06Q 30/02 345/2.3 |
| 2012/0303458 A1* | 11/2012 | Schuler, Jr. | G09F 21/048 705/14.63 |
| 2015/0175161 A1* | 6/2015 | Breed | B60W 30/09 348/148 |
| 2015/0194082 A1* | 7/2015 | McEwan | B60Q 1/444 40/209 |
| 2017/0200197 A1* | 7/2017 | Brubaker | G09F 21/048 |
| 2018/0297525 A1* | 10/2018 | Raybuck, III | G06K 9/00805 |
| 2019/0034967 A1* | 1/2019 | Ferguson | G05D 1/0038 |
| 2019/0050905 A1 | 2/2019 | Tonomura et al. | |

(Continued)

FOREIGN PATENT DOCUMENTS

JP 2019-036048 A 3/2019

*Primary Examiner* — Albert K Wong
(74) *Attorney, Agent, or Firm* — Sughrue Mion, PLLC

(57) ABSTRACT

An information providing device includes a display unit configured to display information to a preset view area by emitting light, a detection unit, a first determination, a second determination unit, and a control unit configured to perform an operation control of the display unit. The display unit displays the information in a main display mode and a sub display mode having a less influence on a travelling of a nearby vehicle than the main display mode has. While the information is displayed in the main display mode, the control unit switches the main display mode to the sub display mode or stops an operation of the display unit when the first determination unit determines that the possibility of entry exceeds the threshold, or when the second determination unit determines that the nearby vehicle exists in the view area.

3 Claims, 10 Drawing Sheets

(56) References Cited

U.S. PATENT DOCUMENTS

| | | | |
|---|---|---|---|
| 2020/0404465 A1* | 12/2020 | Manicka | G02B 27/01 |
| 2021/0174714 A1* | 6/2021 | DeLorean | G08G 1/095 |
| 2021/0233442 A1* | 7/2021 | DeLorean | G06Q 30/0241 |
| 2021/0276634 A1* | 9/2021 | Brereton | G01S 19/42 |
| 2021/0319477 A1* | 10/2021 | Malihy | G06Q 30/0266 |

\* cited by examiner

INFORMATION PROVIDING DEVICE

CROSS-REFERENCE TO RELATED APPLICATION

This application claims priority to Japanese Patent Application No. 2019-223013 filed on Dec. 10, 2019, the entire disclosure of which is incorporated herein by reference.

BACKGROUND ART

The present disclosure relates to an information providing device.

Japanese Patent Application Publication No. 2019-36048 discloses a conventional information providing device. This information providing device 15 includes an information display object, a detection unit, a display unit, and a control unit. The information display object is provided by, for example, a signage, and provided on a roadway where vehicles travel. A predetermined piece of information is displayed on the information display object. The detection unit detects a vehicle positioned around the information display object. The display unit is provided by a liquid crystal display in a vehicle compartment. The control unit performs an operation control of the display unit.

In this information providing device, the control unit performs the operation control of the display unit when the vehicle detected by the detection unit passes in the vicinity of the information display object. Specifically, the control unit causes the display unit to display related information that is related to the information displayed on the information display object. In this way, this information providing device can provide the related information to passengers of the vehicle with the display unit, in addition to the information display object.

In recent years, a vehicle is used as an information providing vehicle that provides information towards an outside while travelling with the display unit provided in the information providing vehicle. In a configuration in which the display unit displays the information towards the outside of the information providing vehicle by emitting light, for securing the traffic safety, the display unit needs to be controlled so as to minimize an influence, which is caused by a display of the information on the display unit, on nearby vehicles travelling within a predetermined area from the information providing vehicle. However, since the display of the information having the minimized influence on the nearby vehicles is not capable of displaying information effectively on the display unit, it makes the information unnoticeable and it makes the information hard to understand. As a result, it is difficult to provide the information sufficiently.

The present disclosure is directed to providing an information providing device that provides information sufficiently while reducing an influence on the travelling of nearby vehicles.

SUMMARY

In accordance with an aspect of the present disclosure, there is provided an information providing device using an information providing vehicle and providing information to an outside of the information providing vehicle. The information providing device includes a display unit disposed on a side surface of the information providing vehicle, and configured to display the information to a preset view area by emitting light, a detection unit configured to set a detection area broader than the view area around the information providing vehicle, and configured to detect a nearby vehicle positioned in the detection area, a first determination unit configured to compute a possibility of entry that is a possibility that the nearby vehicle enters the view area, and configured to determine whether or not the possibility of entry exceeds a preset threshold, a second determination unit configured to determine whether or not the nearby vehicle exists in the view area, and a control unit configured to perform an operation control of the display unit. The display unit displays the information in a main display mode and a sub display mode having a less influence on a travelling of the nearby vehicle than the main display mode has. While the information is displayed in the main display mode, the control unit switches the main display mode to the sub display mode or stops an operation of the display unit when the first determination unit determines that the possibility of entry exceeds the threshold, or when the second determination unit determines that the nearby vehicle exists in the view area.

Other aspects and advantages of the present disclosure will become apparent from the following description, taken in conjunction with the accompanying drawings, illustrating by way of example the principles of the present disclosure.

BRIEF DESCRIPTION OF DRAWINGS

The present disclosure together with objects and advantages thereof may best be understood by reference to the following description of the presently preferred embodiments together with the accompanying drawings in which:

FIG. 4 is a schematic view illustrating a display of information in a main display mode and a display of the information in a sub display mode according to the information providing device of the present embodiment; in which FIG. 4A shows a display of the information in the main display mode, FIG. 4B shows a display of the information in a first sub display mode, and FIG. 4C is a display of the information in a second sub display mode;

DETAILED DESCRIPTION OF THE EMBODIMENTS

The following will describe an embodiment of the present disclosure with reference to the accompanying drawings.

Figure 1:
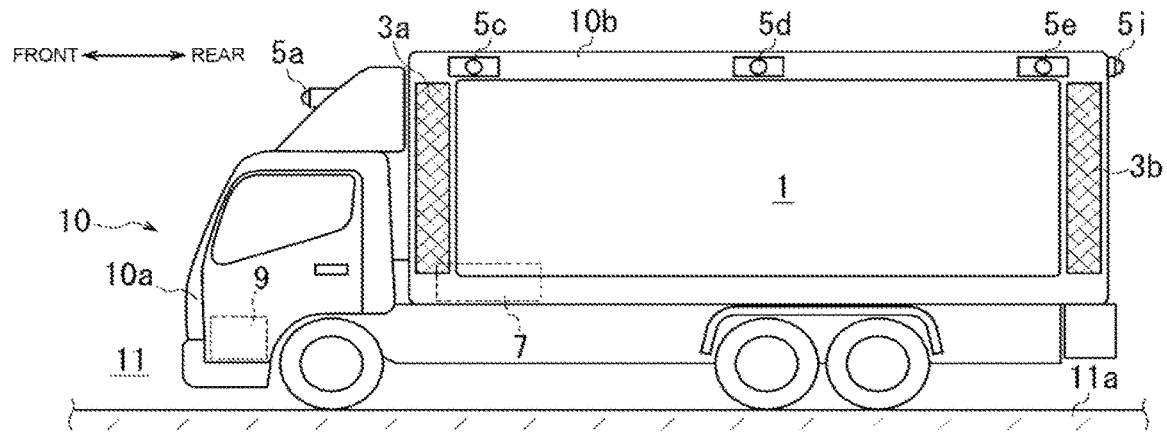
FIG. 1 is a side view illustrating an information providing vehicle on which an information providing device according to a present embodiment is mounted.
Figure 2:
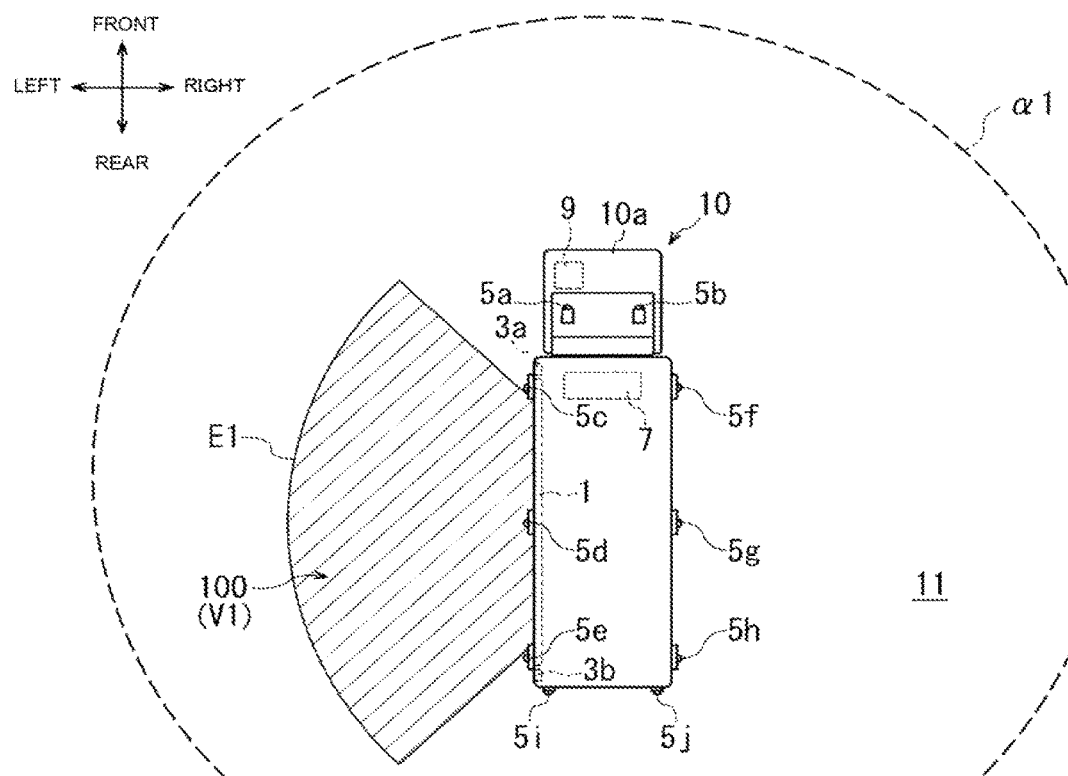
FIG. 2 is a plan view of the information providing vehicle on which the information providing device of the present embodiment is mounted.
Figure 3:
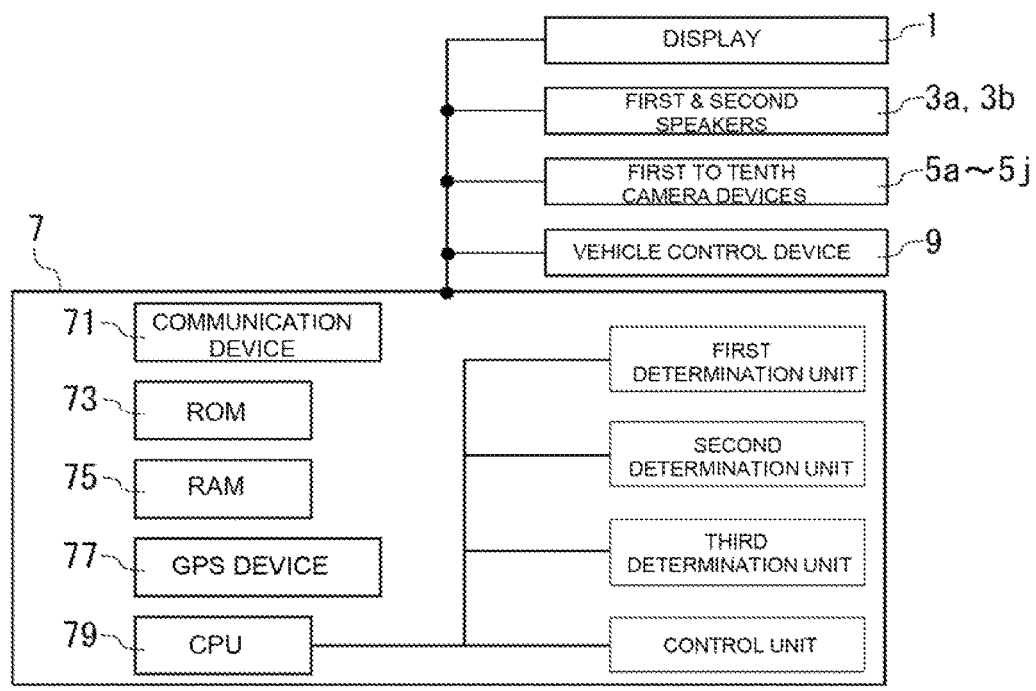
FIG. 3 is a block diagram illustrating the information providing device of the present embodiment.

As illustrated in FIGS. 1 through 3, an information providing device of the present embodiment includes a display 1, a first and a second speaker 3a, 3b, a first to a tenth camera device 5a to 5j, and a device body 7. The display 1 corresponds to an example of a display unit of the present disclosure. In addition, the first to the tenth camera device 5a to 5j correspond to an example of a detection unit of the present disclosure.

The information providing device of the present embodiment, i.e., the display 1, the first and the second speaker 3a, 3b, the first to the tenth camera device 5a to 5j, and the device body 7, is mounted on an information providing vehicle 10 illustrated in FIGS. 1 and 2. The information providing vehicle 10 is a vehicle for providing information 100 (FIG. 4) using the information providing device of the present embodiment. In the present embodiment, a truck is used as the information providing vehicle 10. The information 100 to be provided by the information providing device includes traffic information and broadcast image, in addition to an advertisement.

Figure 5:
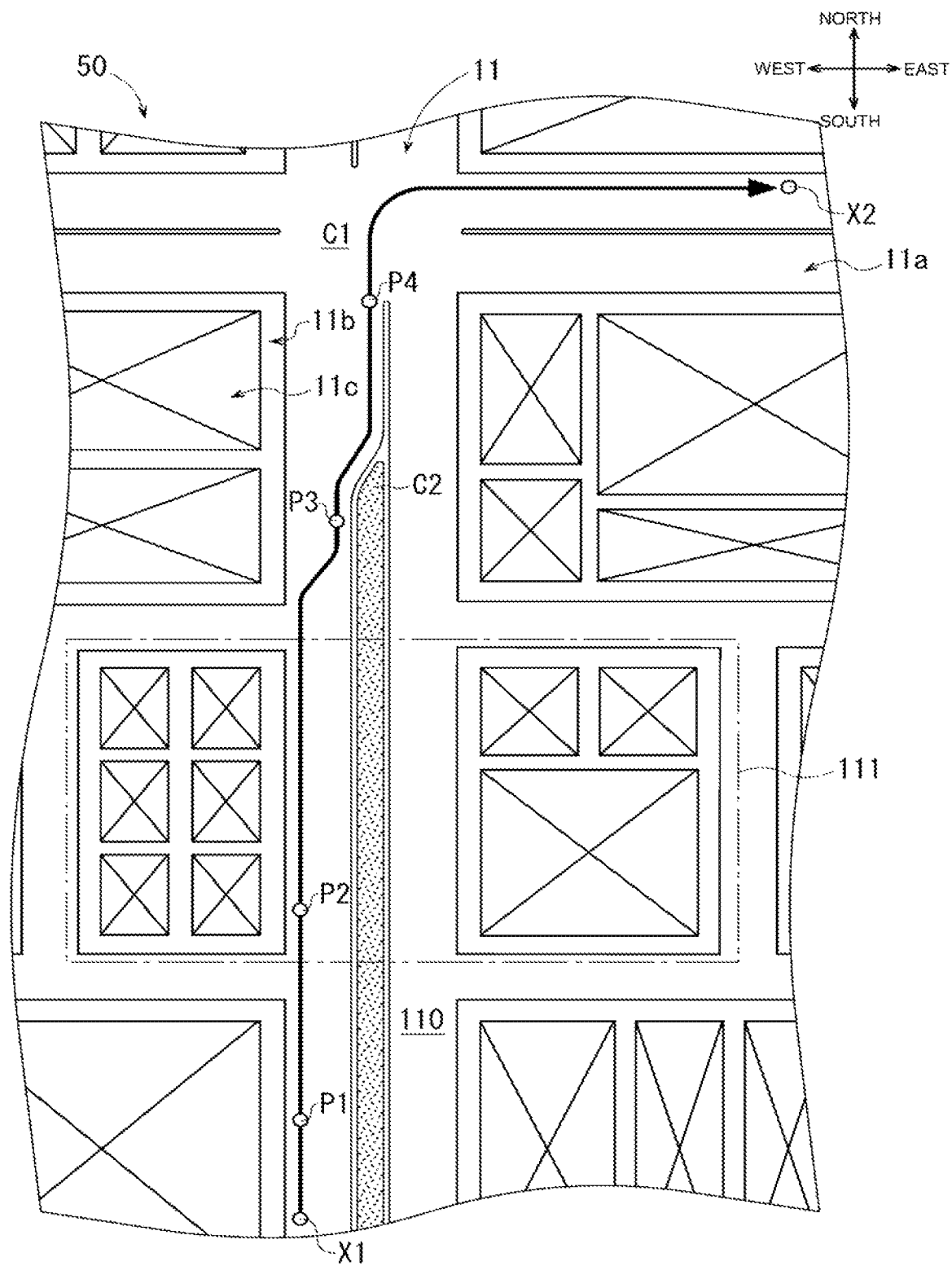
FIG. 5 is a schematic view illustrating a travel area and map data of the travel area of the information providing device of the present embodiment.

In the present embodiment, the front-rear direction and the left-right direction of the information providing vehicle 10 are indicated by the solid arrows in FIGS. 1 and 2. In FIG. 5, the solid line arrows define each direction of north, south, east, and west in a travel area 11. From FIG. 8 onward, the north, south, east, and west directions correspond to those in FIG. 5. These descriptions of the directions are example, provided for the sake of the descriptions.

As illustrated FIGS. 1 and 2, the information providing vehicle 10 includes a cab 10a positioned in the front of the information providing vehicle 10 and a body part (truck body) 10b positioned rearward of the cab 10a. A vehicle control device 9 is provided in the cab 10a. The vehicle control device 9 causes the information providing vehicle 10 to travel autonomously in the travel area 11 illustrated in FIGS. 5, and 8 to 11 while managing travel data including a travelling direction and a travel speed of the information providing vehicle 10. Accordingly, neither a driver no operator for operating the display 1 is on board on the information providing vehicle 10. The travel area 11 will be described later.

The display 1 is provided by a liquid crystal display, and has a generally rectangular shape. The display 1 is provided in the body part 10b. The display 1 is provided on the left side surface of the body part 10b, i.e., only on the left side of the information providing vehicle 10. The display 1 emits alight to display the information 100 through a moving image and a still image. The display 1 is configured to display the information 100 in a main display mode V1 illustrated in FIG. 4A, and in a sub display mode V2 illustrated in FIGS. 4B and 4C. The sub display mode V2 includes a first sub display mode V21 illustrated in FIG. 4B, and a second sub display mode V22 illustrated in FIG. 4C.

That is, the display 1 is configured to display the information 100 in three display modes, namely, the main display mode V1, the first sub display mode V21, and the second sub display mode V22. As illustrated in FIG. 2, a view area E1 is preset for the display 1. The view area E1 extends outwardly from the display 1 in a generally fan shape with a predetermined angle. The display 1 is configured to display the information 100 to the view area E1, in the main display mode V1, the first sub display mode V21, and the second sub display mode V22.

The main display mode V1 illustrated in FIG. 4A is a basic mode when the display 1 displays the information 100. The intensity of light and a color of light are set for the main display mode V1 so that the information 100 can be displayed most effectively on the display 1. The intensity of light emitted from the display 1 in the first sub display mode V21 illustrated in FIG. 4B is set weaker than that in the main display mode V1, though the information 100 is displayed with the same contents and in the same color in the main display mode V1 and the first sub display mode V21.

When the display 1 displays the information 100 in the second sub display mode V22 illustrated in FIG. 4C, the intensity of light is set weaker than that in the main display mode V1 and the information 100 is displayed in a different color from the main display mode V1, though the same contents of the information 100 are displayed in the main display mode V1 and the second sub display mode V22. The intensities of light and the color of light emitted in the first sub display mode V21 and the second sub display mode V22 are set so as to meet the safety standards imposed for the traffic safety, and regulations and rules applied to the travel area 11. In the present disclosure, a first requirement that the intensity of light is weaker than that in the main display mode V1 and a second requirement that a color of light is different from the color in the main display mode are set. The first sub display mode V21 is set so as to satisfy a first requirement and the second sub display mode V22 is set so as to satisfy both of the first requirement and the second requirement in the present disclosure. It is noted that the second sub display mode V22 may be set so as to satisfy the second requirement only according to the present disclosure.

A publicly available speaker is used for the first speaker 3a and the second speaker 3b illustrated in FIGS. 1 and 2. The first and the second speaker 3a, 3b are provided only on the left side surface of the body part 10b. Specifically, the first speaker 3a is disposed frontward of the display 1 on the left side surface of the body part 10b. The second speaker 3b is disposed rearward of the display 1 on the left side surface of the body part 10b. The first and the second speaker 3a, 3b provide the information 100 by sound. The first speaker 3a and the second speaker 3b may be omitted.

The first to the tenth camera device 5a to 5j have the same configuration, which are configured to capture a moving image. As illustrated in FIG. 2, the first and the second camera device 5a, 5b of the first to the tenth camera device 5a to 5j are provided in the cab 10a of the information providing vehicle 10. The third to the tenth camera device 5c to 5j are provided in the body part 10b of the information providing vehicle 10. More specifically, the first camera device 5a is provided in the upper left of the cab 10a so as to capture an image of a certain area in the front left of the information providing vehicle 10. The second camera device 5b is provided in the upper right of the cab 10a so as to capture an image of a certain area in the front right of the information providing vehicle 10. The third to the fifth camera device 5c to 5e are provided on the left side surface of the body part 10b so as to capture an image of a certain area on the left side of the information providing vehicle 10. The sixth to the eighth camera devices 5f to 5h are provided on the right side surface of the body part 10b so as to capture an image of a certain area on the right side of the of the information providing vehicle 10. The ninth camera device 5i is provided in the rear left of the body part 10b so as to capture a certain area in the rear left of the information providing vehicle 10. The tenth camera device 5j is provided in the rear right of the body part 10b so as to capture a certain area in the rear tight of the information providing vehicle 10.

Figure 8:
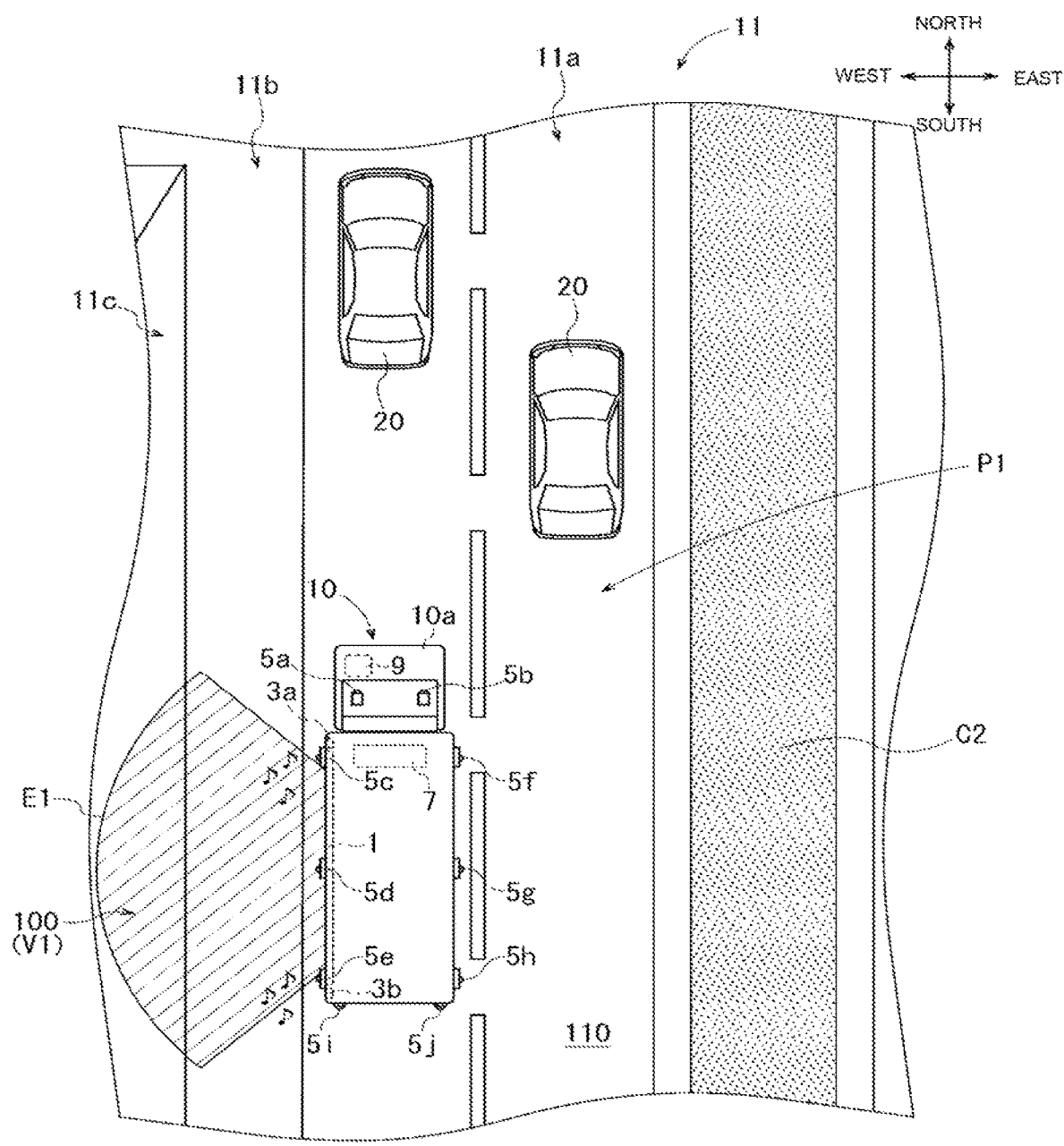
FIG. 8 is an enlarged schematic view illustrating the information providing vehicle at a first point in FIG. 5 according to the information providing device of the present embodiment.

The first to the tenth camera device 5a to 5j have an image processing unit, respectively. The image processing unit combines the areas captured by the first to the tenth camera device 5a to 5j to set a detection area α1 around the information providing vehicle 10 within a predetermined area from the information providing vehicle 10. The predetermined area is set broader than the view area E1 of the display 1. The detection area α1 is set for an area broader than the view area E1. The image processing unit detects vehicles positioned within the predetermined area, i.e., in the detection area α1, other than the information providing vehicle 10 as nearby vehicles 20 (FIG. 8) by referring to the images captured by the first to the tenth camera device 5a to 5j and the detection area α1. The nearby vehicles 20 in FIG. 8 illustrates an example of the shape and the configuration of the nearby vehicles 20, and examples of the nearby vehicles 20 include a vehicle such as a bicycle. The size of the detection area α1 may be set suitably as long as it is broader than the view area E1. The number of the camera devices, i.e., the first to the tenth camera device 5a to 5j, may be changed suitably. The first to the tenth camera device 5a to 5j may be configured to detect the nearby vehicles 20 positioned in the detection area α1 based on the still images repeatedly captured for a predetermined period.

The travel area 11 illustrated in FIGS. 5, and 8 to 12 includes a roadway 11a where the information providing vehicle 10 and the nearby vehicles 20 travel, a sidewalk 11b where a passenger (not illustrated) walks, and a plurality of buildings 11c. The roadway 11a includes an intersection C1, and a median strip C2. Examples of the buildings 11c include a construction and a house. A permitted region 110 and a prohibited region 111 are set in the travel area 11. In the description of the present embodiment, the prohibited region 111 is a part surrounded by the dashed chain line in FIG. 5 and a part other than the prohibited region 111 corresponds to the permitted region 110.

In the permitted region 110, the display of the information 100 in the main display mode V1 and the provision of the information 100 by sound by the first and the second speaker 3a, 3b are permitted. In the prohibited region 111, the display of the information 100 in the main display mode V1 and the sub display mode V2 is prohibited. That is, the display of the information 100 is prohibited in any of the main display mode V1, the first sub display mode V21, and the second sub display mode V22 in the prohibited region 111. In the prohibited region 111, sound outputted from the first and the second speaker 3a, 3b, i.e., the provision of the information 100 by sound, is also prohibited. The positions and the areas of the permitted region 110 and the prohibited region 111 in the travel area 11 need not necessarily be constant, but may be changed depending on the conditions such as the time and a day of the week when the information providing vehicle 10 travels in the travel area 11.

As illustrated in FIGS. 1 and 2, the device body 7 is disposed in the body part 10b. As illustrated in FIG. 3, the device body 7 is connected to the display 1, the first and second speaker 3a, 3b, the first to the tenth camera device 5a to 5j, and the vehicle control device 9. The device body 7 has a communication device 71, a ROM 73, a RAM 75, a GPS device 77, and a CPU 79. The RAM 75 corresponds to an example of a memory unit of the present disclosure. The GPS device 77 corresponds to an example of an extraction unit of the present disclosure.

The communication device 71 connects the display 1, the first and second speaker 3a, 3b, the first to the tenth camera devices 5a to 5j, and the vehicle control device 9 with the device body 7 so as to be communicable with each other, and connects the device body 7 with an external server (not illustrated) so as to be communicable with each other. This configuration allows an operator to remotely control the device body 7 and hence the information providing device via the external server. A control program for controlling device body 7, i.e., a control program for providing the information 100 with the information providing device, is stored in the ROM 73.

The information 100 to be displayed on the display 1 is stored in the RAM 75. That is, three types of display modes, namely, the main display mode V1, the first sub display mode V21, and the second sub display mode V22, are stored in the RAM 75. Additionally, sound data to be played on the first and the second speaker 3a, 3b is stored in the RAM 75.

In addition, map data 50 illustrated in FIG. 5 is stored in the RAM 75. It is noted that the contents of the Information 100 and the map data 50 stored in the RAM 75 may be modified appropriately via the external server communicating with the device body 7. Further, the map data 50 stored in the RAM 75 is used when the vehicle control device 9 causes the information providing vehicle 10 to travel autonomously.

The travel area 11 where the information providing vehicle 10 travels is stored in the map data 50. Thus, the roadway 11a, the sidewalk 11b, the buildings 11c existing in the travel area 11, as well as the permitted region 110 and the prohibited region 111 set in the travel area 11, are stored in the map data 50. Since the positions and the areas of the permitted region 110 and the prohibited region 111 in the travel area 11 can change as described above, the positions and the areas of the permitted region 110 and the prohibited region 111 stored in the map data 50 can change accordingly.

Figure 4:
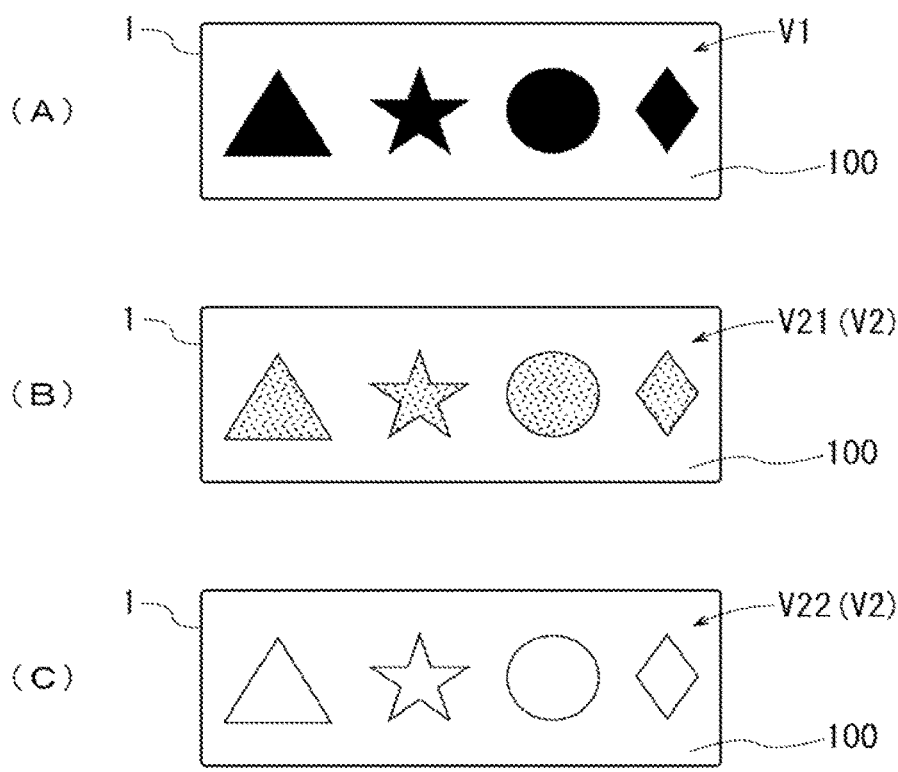

A publicly available product is used for the GPS device 77 illustrated in FIG. 4. The GPS device 77 extracts the current position of the information providing vehicle 10 in the travel area 11 as coordinates data.

The CPU 79 determines whether or not the nearby vehicle 20 detected by the first to the tenth camera device 5a to 5j, i.e., the nearby vehicle 20 existing in the detection area α1, actually exists in the view area E1 of the display 1. The CPU 79 computes a possibility of entry of the nearby vehicle 20 that is a possibility that the nearby vehicle 20 enters the view area E1 in the future though the nearby vehicle 20 detected by the first to the tenth camera devices 5a to 5j does not exist in the view area E1. In computing the possibility of entry, for example, the CPU 79 compares the travel data of the information providing vehicle 10 controlled by the vehicle control device 9 such as the travelling direction and the travelling speed of the information providing vehicle 10 with the travelling direction and the travelling speed of the nearby vehicle 20 obtained by the moving image captured by the first to the tenth camera device 5a to 5j while grasping the positional relationship and the distances between the information providing vehicle 10 and the nearby vehicles 20.

Further, the CPU 79 determines whether or not the computed possibility of entry exceeds a preset threshold.

When the possibility of entry exceeds the threshold, the CPU 79 determines that the nearby vehicle 20 positioned outside the view area E1 will enter the view area E1. When the possibility of entry is less than the threshold, the CPU 79 determines that the nearby vehicle 20 positioned outside the view area E1 will not enter the view area E1.

Further, the CPU 79 determines whether or not the information providing vehicle 10 is positioned in the prohibited region 111 in the travel area 11 based on the map data 50 stored in the RAM 75 and the current position of the information providing vehicle 10 extracted by the GPS device 77.

The CPU 79 controls an operation of the display 1. The CPU 79 is configured to perform the operation control of the display 1. Specifically, the CPU 79 causes the display 1 to operate to display the information 100 and stops the operation of the display 1 so as not to display the information 100. More specifically, the CPU 79 switches a state where the display 1 emits light to display the information 100 in the main display mode V1, the first sub display mode V21 or the second sub display mode V22, and a state where the display 1 stop emitting light so as not to display the information 100. Accordingly, the CPU 79 functions as a first determination unit that determines whether or not the possibility of entry exceeds the threshold, a second determination unit that determines whether or not the nearby vehicle exists in the view area, a third determination unit that determines whether or not the information providing vehicle is positioned in the prohibited region based on the map data and the current position of the information providing vehicle, and a control unit that performs the operation control of the display unit according to the present disclosure. Further, the CPU 79 controls the operation of the first and the second speaker 3a, 3b. Specifically, the CPU 79 switches a state where sound is outputted from the first and the second speaker 3a, 3b, and a state where sound is not outputted from the first and the second speaker 3a, 3b.

The information providing device having the above-described configuration provides the information 100 to the outside of the information providing vehicle 10 through the display 1 and the first and the second speaker 3a, 3b while the information providing vehicle 10 travels in the travel area 11. The outside of the information providing vehicle 10 corresponds to pedestrians walking on the sidewalk 11b in the travel area 11. The following will describe the operation of the information providing device in detail with reference to a case where the information providing vehicle 10 travels from a departure point X1 to a destination X2 illustrated in FIG. 5.

Figure 6:
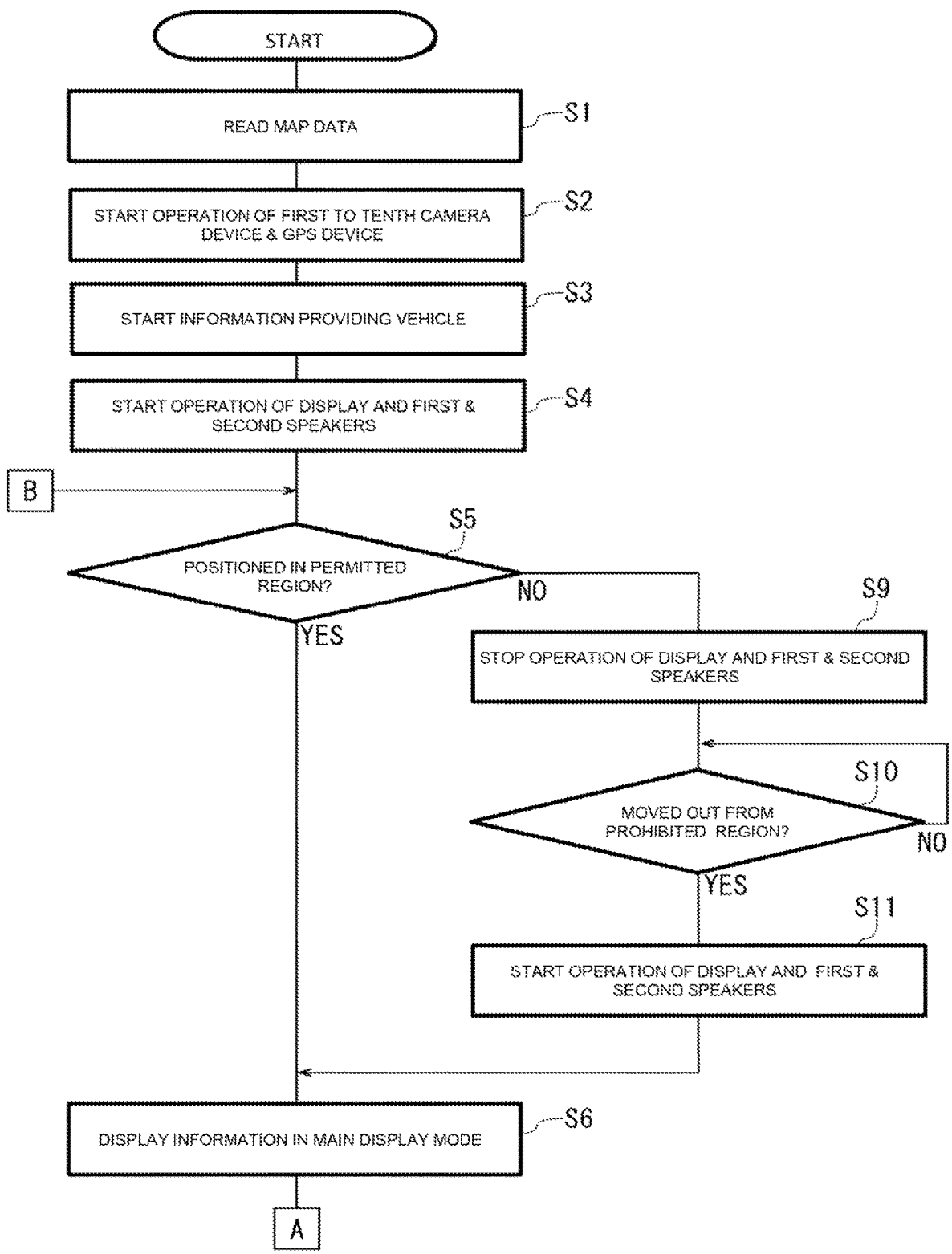
FIG. 6 is a flowchart showing a control flow of the information providing device of the present embodiment.

Firstly, the information providing vehicle 10 is positioned at the departure point X1 with the autonomous travel of the information providing vehicle 10 or with the information providing vehicle 10 transported by a transporting vehicle. The map data 50 stored in the RAM 75 is read (Step S1 in FIG. 6). At this time, the map data 50 recorded in the external server may be newly obtained if required.

The operations of the first to the tenth camera device 5a to 5j and the GPS device 77 are started (Step S2). Thus, the first to the tenth camera device 5a to 5j start detecting the nearby vehicle 20 while setting the detection area α1. The GPS device 77 extracts the current position of the information providing vehicle 10. Then, the vehicle control device 9 determines a route for the information providing vehicle 10 to travel from the departure point X1 to the destination X2 in FIG. 5. In the present embodiment, the route for the information providing vehicle 10 in which the information providing vehicle departs from the departure point X1, passes through the first to the fourth point P1 to P4, turns right at the intersection C1, and proceeds to the destination X2 is determined. The vehicle control device 9 starts the travelling of the information providing vehicle 10 along this route (Step S3 in FIG. 6). Accordingly, the information providing vehicle 10 starts autonomous travel from the departure point X1 to the first point P1.

With the start of the travelling of the information providing vehicle 10, the CPU 79 performs the operation control of the display 1 to operate the display 1 (Step S4). Further, the CPU 79 determines whether or not the information providing vehicle 10 is not currently positioned in the prohibited region 111, that is, whether or not the information providing vehicle 10 is positioned in the permitted region 110 (Step S5). As illustrated in FIGS. 5 and 8, the departure point X1 and the first point P1 are positioned in the permitted region 110. While the information providing vehicle 10 is travelling near the first point P1 including when the information providing vehicle 10 is positioned at the first point P1, the CPU 79 determines that the information providing vehicle 10 is not positioned in the prohibited region 111 but is positioned in the permitted region 110 (YES at Step S5 in FIG. 6). Thus, the CPU 79 causes the display 1 to display the information 100 in the main display mode V1 illustrated in FIG. 4A (Step S6). The CPU 79 operates the first and the second speaker 3a, 3b to output sound.

Thus, the information 100 is provided from the left side surface of the information providing vehicle 10 by the display 1 and the first and the second speaker 3a, 3b. In this state, the vehicle control device 9 causes the information providing vehicle 10 to travel from the first point P1 to the second point P2. As illustrated in FIG. 8, the vehicle control device 9 controls the information providing vehicle 10 so that the information providing vehicle 10 travels on a lane closest to the sidewalk 11b of the traffic lanes of the roadway 11a, i.e., the leftmost traffic lane, so as to provide the information 100 to the pedestrians walking on the sidewalk 11b effectively.

When the first to the tenth camera device 5a to 5j detect a nearby vehicle 20 existing in the detection area α1 (FIG. 2) while the information providing vehicle 10 travels and provides the information 100, the CPU 79 of the device body 7 computes the possibility of entry of the nearby vehicle 20 into the view area E1. The CPU 79 determines that the possibility of entry of the nearby vehicle 20 into the view area E1 is less than the threshold when the speed of the nearby vehicle 20 travelling in front of the information providing vehicle 10 is higher than the information providing vehicle 10 and when the nearby vehicle 20 travels on the side of the information providing vehicle 10 where the display 1 is not provided such as the front right of the information providing vehicle 10 as illustrated in FIG. 8 (YES at Step S7 in FIG. 7). That is, the CPU 79 determines that the nearby vehicles 20 travelling at positions illustrated in FIG. 8 do not enter the view area E1 even if the information providing vehicle 10 keeps travelling in this state. Thus, the CPU 79 causes the display 1 to keep displaying the information 100 in the main display mode V1. Although the illustration is omitted, the CPU 79 determines that the possibility of entry of the nearby vehicles 20 into the view area E1 is less than the threshold when there is a nearby vehicle 20 travelling on the right side of the median strip C2.

The CPU 79 determines whether or not the information providing vehicle 10 reaches the destination X2 based on the current position of the information providing vehicle 10 obtained from the GPS device 77 (Step S8). As illustrated in FIG. 8, while the information providing vehicle 10 travelling from the first point P1 to the second point P2, the CPU 79 determines that the information providing vehicle 10 has not reached the destination X2 (NO at Step S8 in FIG. 7). The processing of Step S5 in FIG. 6 and the following Steps will be repeated until the CPU 79 determines that the information providing vehicle 10 reaches the destination X2.

Figure 9:
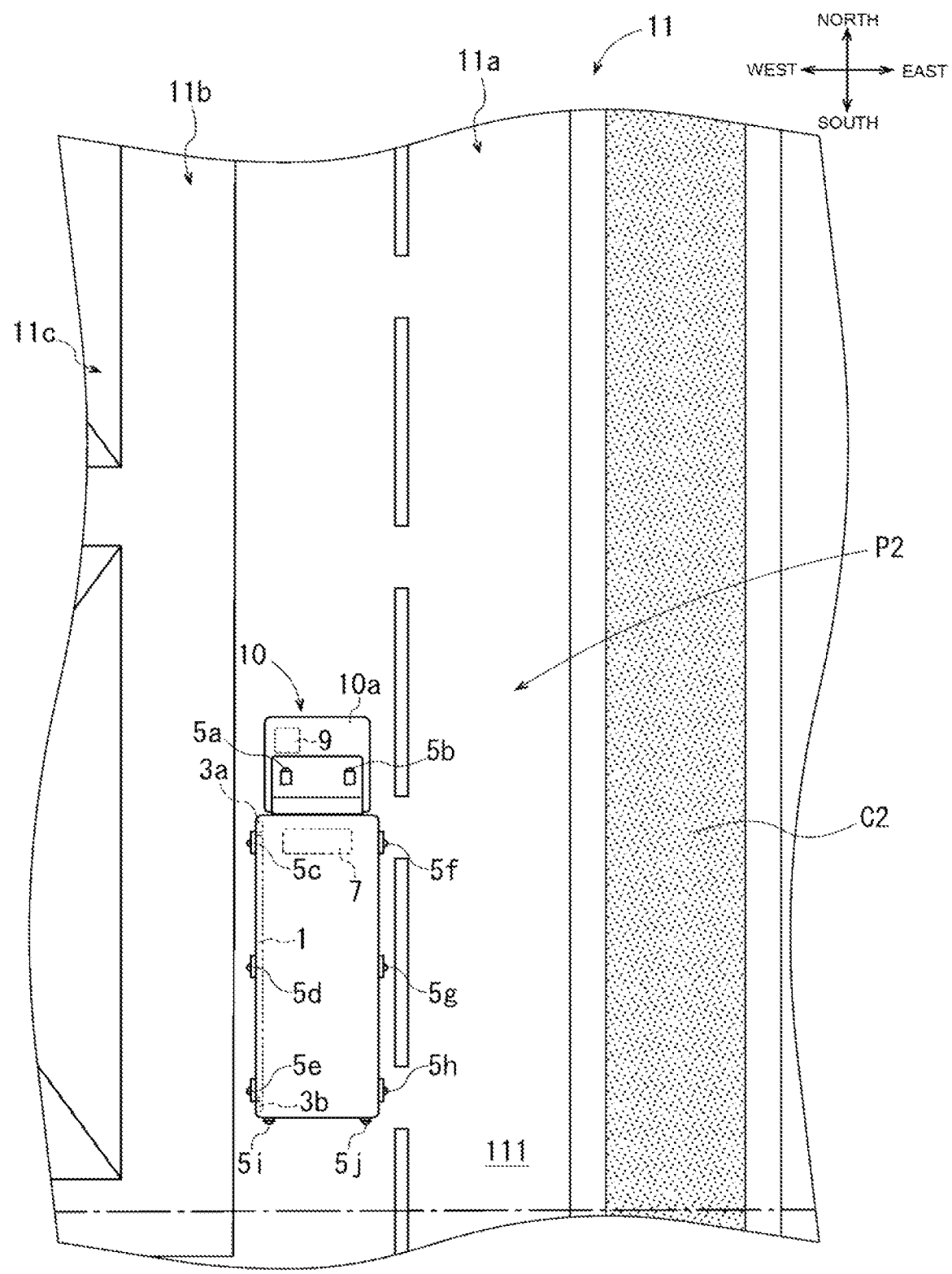
FIG. 9 is an enlarged schematic view illustrating the information providing vehicle at a second point in FIG. 5 according to the information providing device of the present embodiment.

The information providing vehicle 10 is caused to continue travelling while providing the information 100 so as to reach the second point P2, as illustrated in FIG. 9. The second point P2 is located in the prohibited region 111. Therefore, the CPU 79 determines that the information providing vehicle 10 is positioned in the prohibited region 111, that is, the information providing vehicle 10 is not positioned in the permitted region 110 (NO at Step S5 in FIG. 6). Therefore, the CPU 79 stops the operations of the display 1 and the first and the second speaker 3a, 3b (Step S9). With the emission of light form the display 1 stopped, the information 100 is not displayed on the display 1. Additionally, the output of sound from the first and the second speaker 3a, 3b is stopped.

After the CPU 79 stops the operations of the display 1 and the first and the second speaker 3a, 3b at Step S9, the CPU 79 determines whether or not the information providing vehicle 10 has moved out from the prohibited region 111 based on the map data 50 and the current position of the information providing vehicle 10 (Step S10). When the CPU 79 determines that the information providing vehicle 10 has not moved out from the prohibited region 111 (NO at Step S10), the CPU 79 keeps stopping the operations of the display 1 and the first and the second speaker 3a, 3b. Accordingly, the information 100 is not provided while the information providing vehicle 10 travels in the prohibited region 111 including when the information providing vehicle 10 is positioned at the second point P2. In a case where the provision of the information 100 by sound is permitted in the prohibited region 111, the CPU 79 continues operating the first and the second speaker 3a, 3b. Thus, the information 100 is provided only by sound from the first and the second speaker 3a, 3b while the information providing vehicle 10 travels in the prohibited region 111.

When the CPU 79 determines that the information providing vehicle 10 has moved out from the prohibited region 111 (YES at Step S10), the CPU 79 starts the operations of the display 1 and the first and the second speaker 3a, 3b (Step S11). The CPU 79 causes the display 1 to display the information 100 in the main display mode V1 (Step S6). The information providing vehicle 10 travels towards the third point P3 while provision of the information 100 by the display 1 and the first and the second speaker 3a, 3b restarts.

Figure 10:
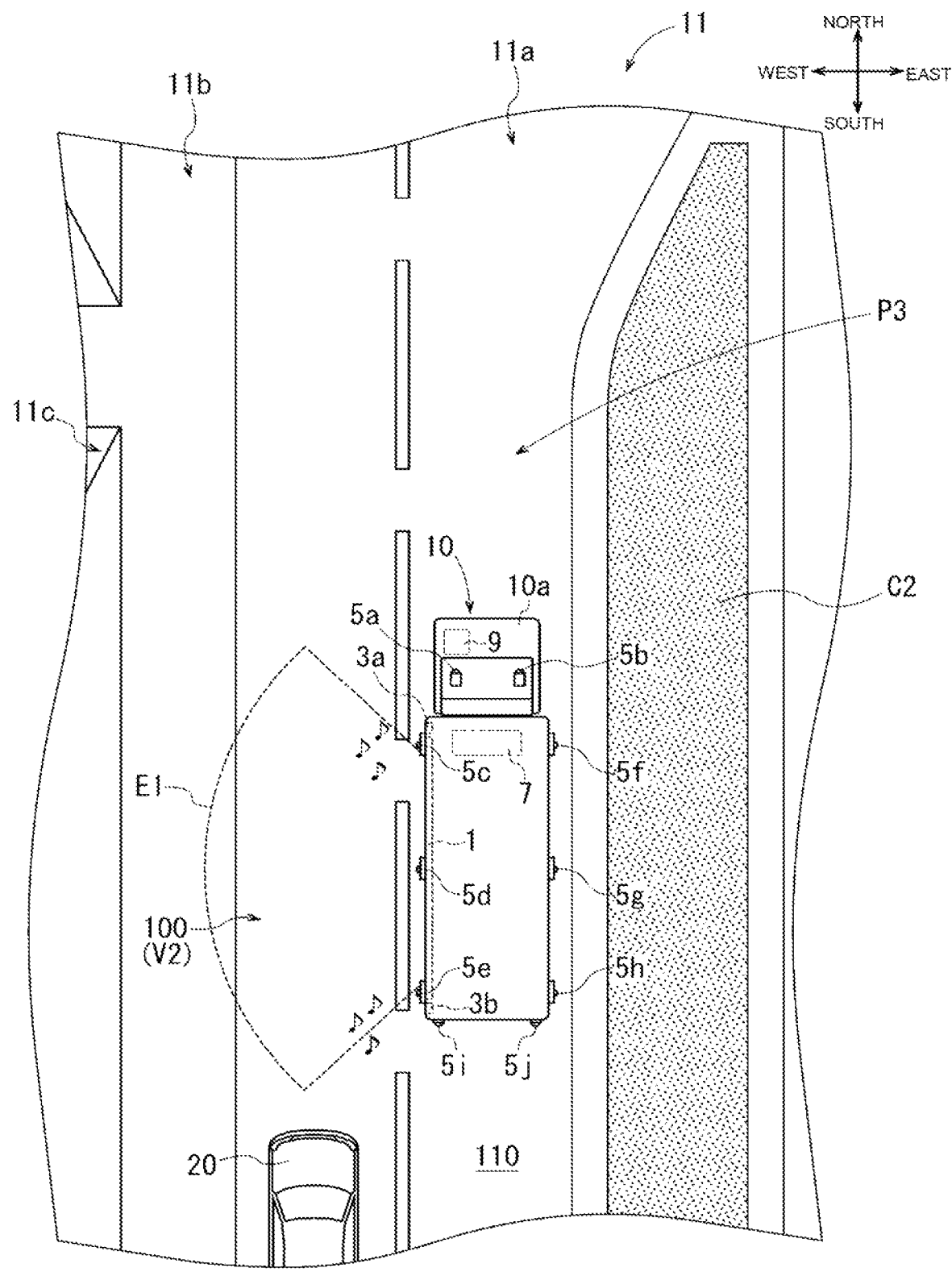
FIG. 10 is an enlarged schematic view illustrating the information providing vehicle at a third point in FIG. 5 according to the information providing device of the present embodiment.

As illustrated in FIG. 10, with the information providing vehicle 10 having reached the third point P3, the vehicle control device 9 causes the information providing vehicle 10 to change the traffic lanes to the right side lane for turning right at the intersection C1. When a nearby vehicle 20 is positioned in the rear left of the information providing vehicle 10, as illustrated in FIG. 10, and the nearby vehicle 20 is travelling at a speed higher than the information providing vehicle 10, the CPU 79 determines that the possibility of entry of the nearby vehicle 20 into the view area E1 exceeds the threshold (NO at Step S7 in FIG. 7).

Figure 7:
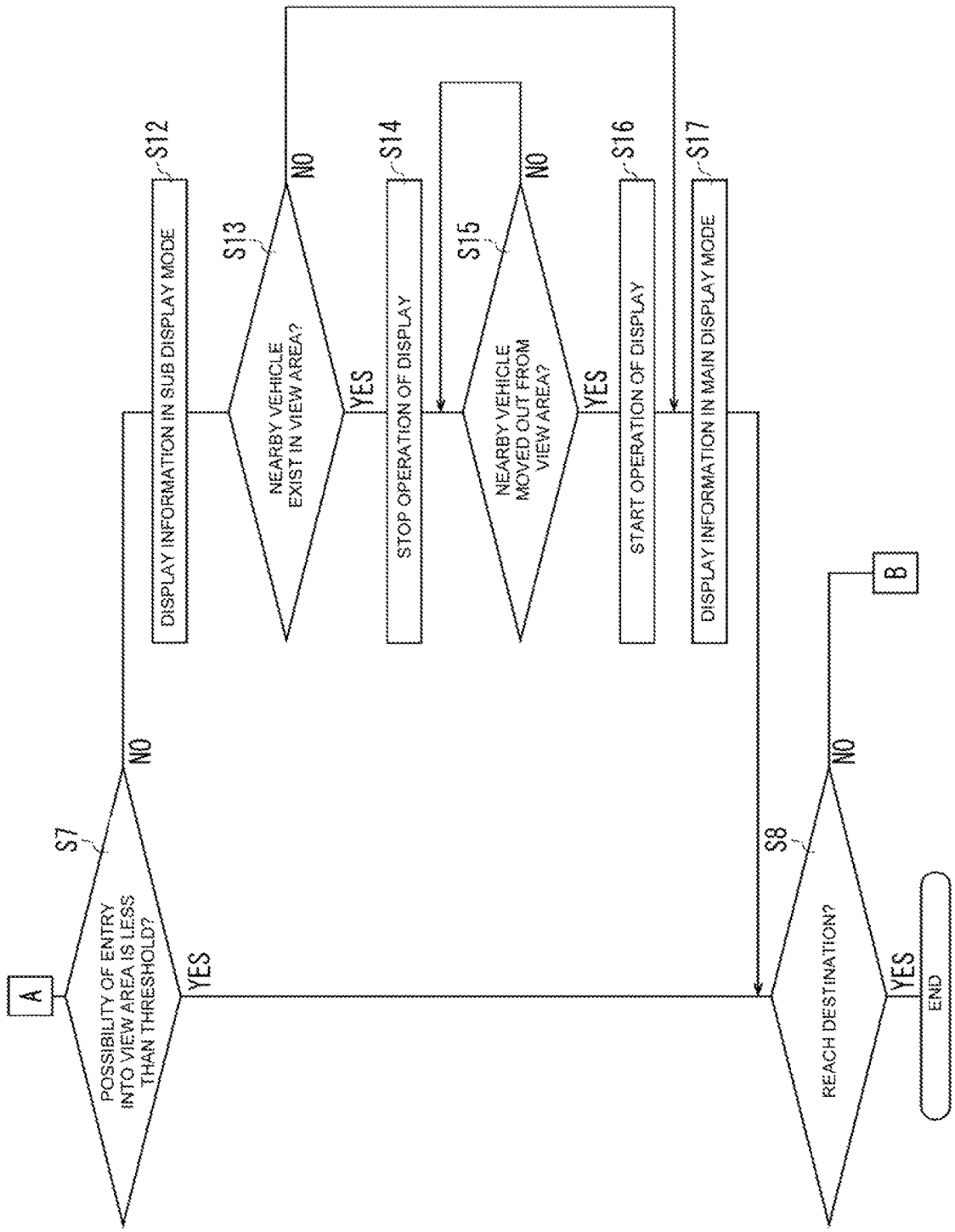
FIG. 7 is a flowchart showing a control flow of the information providing device of the present embodiment.

In this case, as illustrated in FIG. 10, the CPU 79 controls the display 1 to switch the display mode from the main display mode V1 to the sub display mode V2 so as to display the information 100 in the sub display mode V2 (Step S12 in FIG. 7). In displaying the information 100 in the sub display mode V2, which one of the first sub display mode V21 illustrated in FIG. 4B and the second sub display mode V22 illustrated in FIG. 4C is selected may be determined by conditions such as the time and weather when the information providing vehicle 10 travels, as well as the degree of congestion of the roadway where the information providing vehicle 10 travels.

After the information 100 is displayed in the sub display mode V2, the CPU 79 determines whether or not the nearby vehicle 20 actually exists in the view area E1 (Step S13 in FIG. 7). For example, the CPU 79 determines that the nearby vehicle 20 actually exists in the view area E1 (YES at Step S13) when the nearby vehicle 20 actually catches up with the information providing vehicle 10 or when the nearby vehicle 20 is taking over the information providing vehicle 10 while the information 100 is being displayed in the sub display mode V2.

Figure 11:
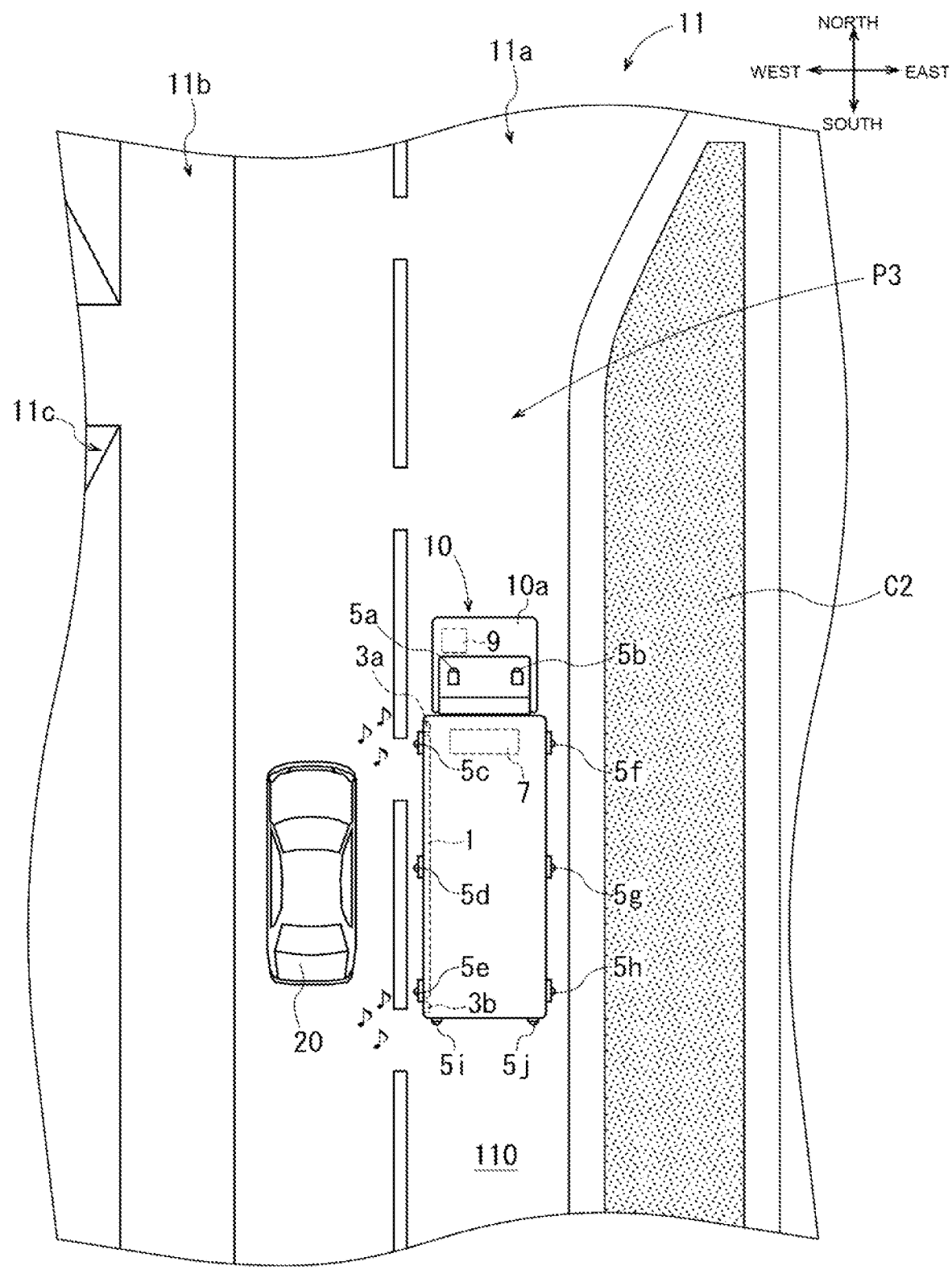
FIG. 11 is an enlarged schematic view illustrating the information providing vehicle at the third point in FIG. 5 according to the information providing device of the present embodiment.

In this case, the CPU 79 stops the operation of the display 1 (Step S14). Thus, while the nearby vehicle 20 exists in the view area E1 as illustrated in FIG. 11, the information 100 is not displayed on the display 1. As a result, while the nearby vehicle 20 exists in the view area E1, the information 100 is provided only by sound from the first and the second speaker 3a, 3b.

The CPU 79 determines whether or not the nearby vehicle 20 has moved out from the view area E1 after stopping the operation of the display 1 (Step S15 in FIG. 7). For example, when the nearby vehicle 20 has taken over the information providing vehicle 10, the nearby vehicle 20 does not exist in the view area E1. In such a case, the CPU 79 determines that the nearby vehicle 20 has moved out from the view area E1 (YES at Step S15). Subsequently, the CPU 79 restarts the operation of the display 1 (Step S16). Thus, the CPU 79 shows the information 100 in the main display mode V1 on the display 1 (Step S17). In this state, the information providing vehicle 10 travels towards the fourth point P4.

On the other hand, even after the CPU 79 has determined that the possibility of entry of the nearby vehicle 20 into the view area E1 exceeds the threshold and started showing the information 100 in the sub display mode V2, when the nearby vehicle 20 reduces its speed or stops, the nearby vehicle 20 will move out from the view area E1 and hence move away from the information providing vehicle 10. In this case, the CPU 79 determines that the nearby vehicle 20 does not exist in the view area E1 (NO at Step S13). Thus, the CPU 79 switches the display mode from the sub display mode V2 to the main display mode V1 to display the information 100 in the main display mode V1 without stopping 20 the operation of the display 1 (Step S17).

Figure 12:
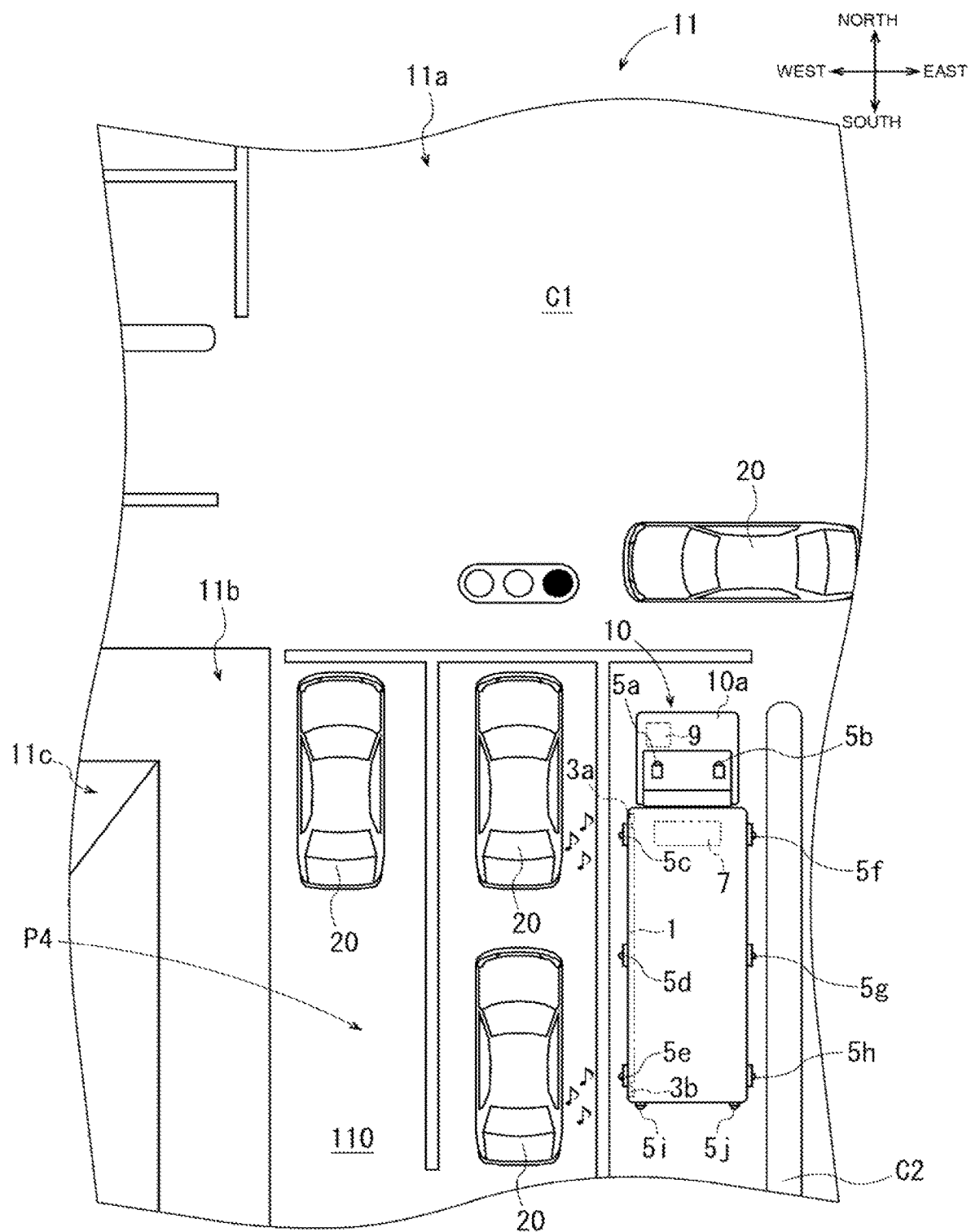
FIG. 12 is an enlarged schematic view illustrating the information providing vehicle at a fourth point in FIG. 5 according to the information providing device of the present embodiment.

As illustrated in FIG. 12, the information providing vehicle 10 having reached the fourth point P4 stops due to the red light of the traffic signal at the intersection C1. When the nearby vehicle 20 stops on the left side of the information providing vehicle 10, the information providing vehicle 10 relatively approaches the nearby vehicle 20. Thus, also in this case, the CPU 79 determines that the possibility of entry of the nearby vehicle 20 into the view area E1 exceeds the threshold (NO at Step S7 in FIG. 7). Thus, the information 100 is displayed in the sub display mode V2 on the display 1 (Step S12).

When the information providing vehicle 10 and the nearby vehicle 20 stop at positions in parallel to each other due to the red light, the nearby vehicle 20 actually exists in the view area E1 of the display 1. The CPU 79 determines that the nearby vehicle 20 exists in the view area E1 (YES at Step S13). In this case, the CPU 79 stops the operation of the display 1 (Step S14). It is noted that the above-described switching of the display mode from the main display mode V1 to the sub display mode V2 and the stopping of the operation of the display 1 may take place in and around the intersection C1 due to the nearby vehicle 20 travelling on other roadways 11a connected to the intersection C1, as well as the entry of the nearby vehicle 20 into the intersection C1.

When the traffic signal turns to the green light from the red light and the information providing vehicle 10 and the nearby vehicle 20 restarts travelling, the CPU 79 determines that the nearby vehicle 20 has moved out from the view area E1 of the display 1 (YES at Step S15) and restarts the operation of the display 1 (Step S16), thereby displaying the information 100 in the main display mode V1 on the display 1 (Step S17). Once the information providing vehicle 10 reaches the destination X2 illustrated in FIG. 5 (YES at Step S8 in FIG. 7), the provision of the information 100 by the information providing device ends.

Accordingly, in the information providing device of the present embodiment, the display 1 can display the information 100 in the main display mode V1 and the sub display mode V2. The sub display mode V2 includes the first sub display mode V21 and the second sub display mode V22. The intensities and the colors of light emitted in the first sub display mode V21 and the second sub display mode V22 are set so as to meet the safety regulations imposed for the traffic safety. The first sub display mode V21 and the second sub display mode V22, that is, the sub display mode V2, have less influence on the nearby vehicle 20 than the main display mode V1 has. This configuration makes it hard for a driver of the nearby vehicle 20 to mistake the information 100 displayed on the display 1 for the tail lamp of the information providing vehicle 10 when the nearby vehicle 20 travels around the information providing vehicle 10. The intensity of the light of the second sub display mode V22 is set weaker than that of the main display mode V1 and in addition, the color of the second sub display mode V22 is different from the main display mode V1. Thus, the second sub display mode V22 has less influence on the nearby vehicle 20 as compared with the first sub display mode V21.

According to the information providing device, while the information 100 is displayed in the main display mode V1, the CPU 79 switches the display mode from the main display mode V1 to the sub display mode V2 when the possibility of entry of the nearby vehicle 20 into the view area E1 of the display 1 exceeds the threshold. Accordingly, the information providing device may reduce the influence from the display 1 on the nearby vehicle 20 while the information 100 is displayed on the display 1 by emitting light.

Further, according to the information providing device, the CPU 79 stops the operation of the display 1 when the nearby vehicle 20 exists in the view area E1. In this case, light is not emitted from the display 1, and the display 1 stop displaying the information 100. Thus, the information providing device provides the information 100 only by sound outputted from the first and the second speaker 3a, 3b, which reduces the influence on the travelling of the nearby vehicle 20.

Further, according to the information providing device, in a state where the information providing vehicle 10 travels within the permitted region 110, when the nearby vehicle 20 does not exist actually in the view area E1 and the possibility of entry of the nearby vehicle 20 into the view area E1 of the display 1 is less than the threshold, the information 100 is displayed in the main display mode V1. The information providing device permits displaying the information 100 on the display 1 effectively. In this case, the information 100 may also be provided by sound outputted from the first and the second speaker 3a, 3b.

Accordingly, the information providing device of the present embodiment permits providing the information 100 sufficiently while reducing the influence on the travelling of the nearby vehicle 20.

In this information providing device, if the prohibited region 111 is set in the travel area 11, the information providing device stops the operation of the display 1 to stop displaying the information 100 while the stopping output of sound from the first and the second speaker 3a, 3b when the information providing vehicle 10 is positioned in the prohibited region 111. The information providing device is less likely to interfere with the townscape and the well-being of residents and permits meeting the rules and regulations imposed for the traffic safety.

In the information providing device, the operation control of the display 1 such as switching the display mode from the main display mode V1 to the sub display mode V2 and stopping the operation of the display 1 is performed by the CPU 79 and thus by the device body 7. Additionally, the operation control of the first and the second speaker 3a, 3b is also performed by the CPU 79. Therefore, this information providing device permits providing the information 100 effectively without an operator to operate the display 1 and the first and the second speaker 3a, 3b or a driver when the information providing vehicle 10 travels autonomously. Accordingly, the information providing device offers excellent convenience.

Although the present disclosure has been described with the embodiment, the disclosure is not limited to the above-described embodiment, but may be suitably modified within the scope for the application.

For example, although the CPU 79 stops the operation of the display 1 when the nearby vehicle 20 exists in the view area E1 of the display 1 in the information providing device of the present embodiment, the configuration is not limited to this. The CPU 79 may be configured to cause the display 1 to display the information 100 in the sub display mode V2 when the nearby vehicle 20 exists in the view area E1 of the display 1.

The information providing device may be configured to stop the operation of the display 1 without switching the display mode from the main display mode V1 to the sub display mode V2 when the CPU 79 determines that the possibility of entry of the nearby vehicle 20 into the view area E1 of the display 1 exceeds the threshold while the information 100 is displayed in the main display mode V1. In this case, after the operation of the display 1 is stopped, if it is determined that the display of the information 100 hardly interferes with the travelling of the nearby vehicle 20 even if the nearby vehicle 20 exists in the view area E1 of the display 1, e.g., when both of the information providing vehicle 10 and the nearby vehicle 20 are at a stop, the information providing device may be configured to display the information 100 in the sub display mode V2

In the information providing device of the present embodiment, although the sub display mode V2 includes the first sub display mode V21 and the second sub display mode V22, the configuration is not limited to this. The sub display mode V2 may include only one of the first sub display mode V21 and the second sub display mode V22. The sub display mode V2 may include a third display mode.

The information providing device may include a laser irradiation device that can detect the nearby vehicle 20 by a laser reflected by the nearby vehicle 20 mounted on the information providing vehicle 10, and use the laser device as a detection unit of the present disclosure.

In the information providing device of the present embodiment, the CPU 79 functions as the first determination unit, the second determination unit, the third determination unit, and the control unit of the present disclosure. However, the information providing device is not limited to this configuration, but members functioning individually for the first determination unit, the second determination unit, the third determination unit, and the control unit may be provided.

In the information providing device of the present embodiment, the display 1 is provided only on the left side surface of the body part 10b of the information providing vehicle 10, but the configuration is not limited to this. The information providing vehicle 10 may have the display 1 on the right side surface of the body part 10b depending on the traffic lanes when the information providing vehicle 10 travel on the roadway 11a.

The information providing vehicle may have the displays 1 on both the left side surface and the right side surface of the body part 10b. In this case, the CPU 79 may be configured to control the operations of the displays 1 on the left side surface and the right side surface of the body part 10b separately.

In the information providing device of the present embodiment, a truck having the body part 10b is used as the information providing vehicle 10, but the configuration is not limited to this. A general passenger vehicle may be used as the information providing vehicle 10, and a display unit such as the display 1 may be provided on a side panel of the vehicle.

The information providing vehicle 10 may be configured to be operated by a driver. Even in this case, according to the information providing device of the present embodiment, the driver need not operate the display 1 and the first and the second speaker 3a, 3b, which allows the driver to concentrate on the driving of the information providing vehicle 10.

An organic electroluminescent display or a LED display may be used as the display unit of the present disclosure, in a place of the display 1 of a liquid crystal display.

INDUSTRIAL APPLICABILITY

The present disclosure is applicable to an advertisement device using a vehicle.

What is claimed is:

1. An information providing device using an information providing vehicle and providing information to an outside of the information providing vehicle, the information providing device comprising:
a display unit disposed on a side surface of the information providing vehicle, and configured to display the information to a preset view area by emitting light;
a detection unit configured to set a detection area broader than the view area around the information providing vehicle, and configured to detect a nearby vehicle positioned in the detection area;
a first determination unit configured to compute a possibility of entry that is a possibility that the nearby vehicle enters the view area, and configured to determine whether or not the possibility of entry exceeds a preset threshold;
a second determination unit configured to determine whether or not the nearby vehicle exists in the view area; and
a control unit configured to perform an operation control of the display unit, wherein
the display unit displays the information in a main display mode and a sub display mode having a less influence on a travelling of the nearby vehicle than the main display mode has,
while the information is displayed in the main display mode, the control unit switches the main display mode to the sub display mode or stops an operation of the display unit when the first determination unit determines that the possibility of entry exceeds the threshold, or when the second determination unit determines that the nearby vehicle exists in the view area.

2. The information providing device according to claim 1, wherein
the sub display mode satisfies at least one of a first requirement that an intensity of light is weaker than that of the main display mode or a second requirement that a color of the light is different from the color of the light in the main display mode so as to meet safety regulations applied to a travel area where the information providing vehicle travels.

3. The information providing device according to claim 1, further comprising:
a memory unit storing a map data in which a travel area where the information providing vehicle travels, a permitted region where a display of the information in the main display mode is permitted in the travel area, and a prohibited region where the display of the information in the main display mode and the sub display mode are prohibited are stored;
an extraction unit configured to extract a current position of the information providing vehicle in the travel area; and
a third determination unit configured to determine whether the information providing vehicle is positioned in the prohibited region based on the map data and the current position, wherein
the control unit stops an operation of the display unit when the third determination unit determines that the information providing vehicle is positioned in the prohibited region.

* * * * *